(12) United States Patent
Kawaura

(10) Patent No.: US 9,664,947 B2
(45) Date of Patent: May 30, 2017

(54) LIQUID CRYSTAL DISPLAY DEVICE AND LIQUID CRYSTAL DISPLAY

(75) Inventor: Hideaki Kawaura, Kanagawa (JP)

(73) Assignee: Sony Corporation, Tokyo (JP)

( * ) Notice: Subject to any disclaimer, the term of this patent is extended or adjusted under 35 U.S.C. 154(b) by 203 days.

(21) Appl. No.: 13/608,048

(22) Filed: Sep. 10, 2012

(65) Prior Publication Data

US 2013/0076994 A1     Mar. 28, 2013

(30) Foreign Application Priority Data

Sep. 22, 2011   (JP) .................................. 2011-207987

(51) Int. Cl.
| | | |
|---|---|---|
| *G02F 1/1333* | (2006.01) | |
| *G02F 1/1335* | (2006.01) | |
| *G02F 1/1343* | (2006.01) | |
| *G02F 1/1345* | (2006.01) | |
| *G02F 1/1362* | (2006.01) | |

(52) U.S. Cl.
CPC ...... *G02F 1/133553* (2013.01); *G02F 1/1345* (2013.01); *G02F 1/13439* (2013.01); *G02F 1/136209* (2013.01); *G02F 2001/133388* (2013.01)

(58) Field of Classification Search
CPC ............... G02F 1/136209; G02F 2001/133388
USPC .......................................................... 349/111
See application file for complete search history.

(56) References Cited

U.S. PATENT DOCUMENTS

| | | | | |
|---|---|---|---|---|
| 6,081,305 | A * | 6/2000 | Sato et al. ......................... 349/5 |
| 6,580,486 | B1 * | 6/2003 | Sekine ................ G02F 1/13454 349/111 |
| 7,212,263 | B2 * | 5/2007 | Jeoung et al. ................. 349/110 |
| 7,432,994 | B2 * | 10/2008 | Chu et al. ........................ 349/44 |
| 7,532,279 | B2 * | 5/2009 | Akimoto ....................... 349/113 |
| 7,589,801 | B2 * | 9/2009 | Yoon ............................... 349/43 |
| 8,530,912 | B2 * | 9/2013 | Cheng et al. .................... 257/89 |
| 8,817,004 | B2 * | 8/2014 | Lu et al. ........................ 345/211 |
| 8,913,031 | B2 | 12/2014 | Honda et al. |
| 9,310,200 | B2 | 4/2016 | Kabasawa et al. |
| 2008/0006858 | A1 * | 1/2008 | Liu ............................... 257/294 |

(Continued)

FOREIGN PATENT DOCUMENTS

| | | |
|---|---|---|
| JP | 2000-194008 A | 7/2000 |
| JP | 2006-267937 A | 10/2006 |
| JP | 4386066 B2 | 10/2009 |

*Primary Examiner* — Jessica M Merlin
*Assistant Examiner* — Mark Teets
(74) *Attorney, Agent, or Firm* — Wolf, Greenfield & Sacks, P.C.

(57) ABSTRACT

A liquid crystal display device includes: a transparent electrode substrate including a transparent substrate and a transparent electrode, the transparent electrode being formed on one surface of the transparent substrate; a liquid crystal layer; and a pixel electrode substrate including a first layer and a second layer in this order, the first layer including a plurality of pixel electrodes that are located in a region opposed to the transparent electrode with the liquid crystal layer in between, and a first conductive film that is located in a region other than the region opposed to the transparent electrode with the liquid crystal layer in between, the second layer including a second conducive film that is located in a region overlapping the first conductive film. The first conductive film or the second conducive film or both are electrically isolated.

11 Claims, 9 Drawing Sheets

(56) References Cited

U.S. PATENT DOCUMENTS

| | | |
|---|---|---|
| 2011/0175845 A1 | 7/2011 | Honda et al. |
| 2011/0240989 A1 | 10/2011 | Sekine et al. |
| 2011/0285944 A1* | 11/2011 | Park .................... G02F 1/1345 349/110 |
| 2012/0099067 A1* | 4/2012 | Hara ................. G02F 1/136277 349/139 |
| 2012/0113071 A1 | 5/2012 | Kawaguchi et al. |
| 2012/0133879 A1* | 5/2012 | Hosokawa et al. ........... 349/143 |
| 2014/0007682 A1 | 1/2014 | Kabasawa et al. |
| 2015/0277626 A1 | 10/2015 | Shinkai et al. |
| 2015/0280708 A1 | 10/2015 | Goto et al. |
| 2015/0346839 A1 | 12/2015 | Kawaguchi et al. |
| 2015/0363023 A1 | 12/2015 | Kawaguchi et al. |
| 2016/0011691 A1 | 1/2016 | Shinkai et al. |
| 2016/0026297 A1 | 1/2016 | Shinkai et al. |
| 2016/0202800 A1 | 7/2016 | Itaya et al. |
| 2016/0294388 A1 | 10/2016 | Kawaguchi et al. |

* cited by examiner

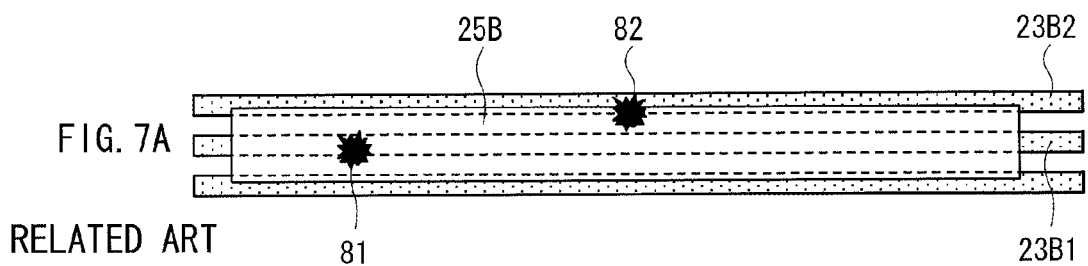
FIG. 7A
RELATED ART
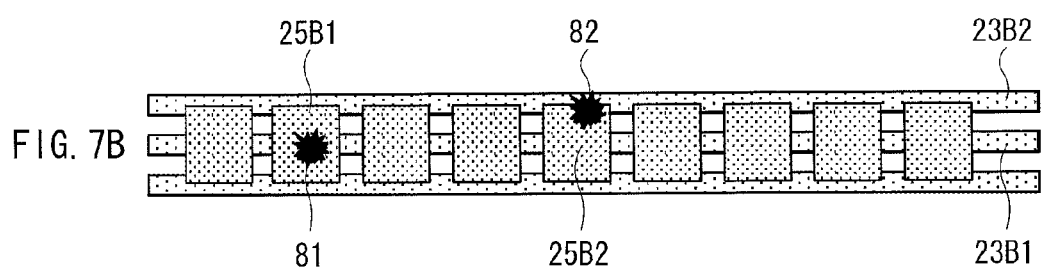
FIG. 7B
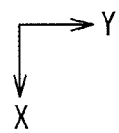

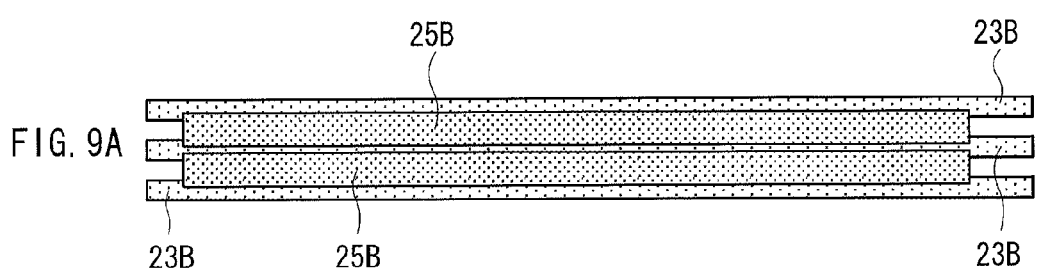
FIG. 9A
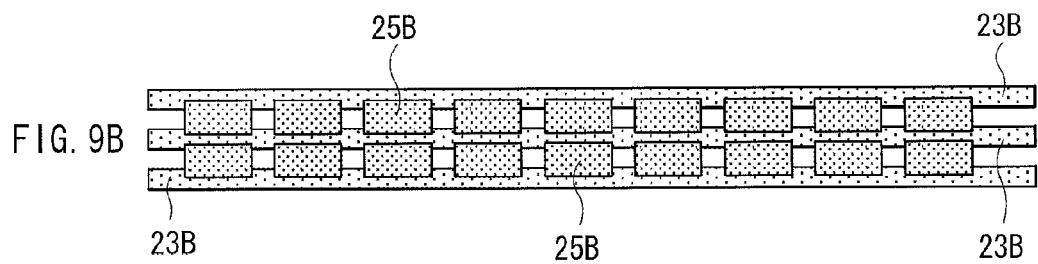
FIG. 9B
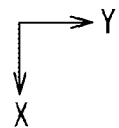

LIQUID CRYSTAL DISPLAY DEVICE AND LIQUID CRYSTAL DISPLAY

CROSS REFERENCE TO RELATED APPLICATION

This application claims the priority benefit of Japanese Patent Application JP 2011-207987filed in the Japanese Patent Office on Sep. 22, 2011, the entire content of which is hereby incorporated by reference.

BACKGROUND

The present disclosure relates to a liquid crystal display device and to a liquid crystal display that includes the liquid crystal display device.

In recent years, as high resolution, downsizing, and high luminance of a projection display have been accelerated, as a display device thereof, a reflective device in which its downsizing and its high resolution are obtainable and its light use efficiency is promising has attracted attention and has come into practical use. As the reflective device, an active-type reflective liquid crystal display device in which liquid crystal is injected into a space between a pair of substrates placed oppositely is known. In this case, a transparent electrode substrate in which a transparent electrode is laminated on a glass substrate is used as one of the pair of substrates, and a drive device substrate using a silicon (Si) substrate configured of, for example, a CMOS (complementary-metal oxide semiconductor)-type semiconductor circuit is used as the other one of the pair of substrates. On the drive device substrate, a metal reflective pixel electrode for reflecting light and applying a voltage to the liquid crystal is arranged, and thereby a pixel electrode substrate is formed as a whole. The reflective pixel electrode is made of a metal material containing aluminum as a main component that is typically used in LSI (large scale integrated) process.

In such a reflective liquid crystal display device, by applying a voltage to the transparent electrode provided on the transparent electrode substrate and to the reflective pixel electrode provided on the drive device substrate, the voltage is applied to the liquid crystal. At this time, the optical characteristics of the liquid crystal are changed according to an electric potential difference between the foregoing electrodes, and incident light is modulated. By such modulation, gradation expression is enabled, and an image is displayed. Of the reflective liquid crystal display devices, in particular, the active-type reflective liquid crystal display device in which perpendicularly-aligned liquid crystal is injected has high contrast and high response speed, and therefore the active-type reflective liquid crystal display device has attracted attention as a projection device in recent years (for example, see Japanese Patent Publication No. 4386066).

SUMMARY

Recently, downsizing and thinning of the liquid crystal display device used as the projection device described above have been increasingly demanded. Therefore, in the drive device substrate (or the pixel electrode substrate), a plurality of conductive layers each having different electric potentials set at the time of operation are arranged at significantly minute intervals in the thickness direction due to layout limitation. Therefore, there is growing concern that some foreign matter is mixed in the drive device substrate (or the pixel electrode substrate) in, for example, a manufacturing step, resulting in short circuit between the conductive layers.

It is desirable to provide a liquid crystal display device capable of avoiding an operation fault due to short circuit while its configuration is compact and a liquid crystal display that includes the liquid crystal display device.

According to an embodiment of the present disclosure, there is provided a liquid crystal display device including: a transparent electrode substrate including a transparent substrate and a transparent electrode, the transparent electrode being formed on one surface of the transparent substrate; a liquid crystal layer; and a pixel electrode substrate including a first layer and a second layer in this order, the first layer including a plurality of pixel electrodes that are located in a region opposed to the transparent electrode with the liquid crystal layer in between, and a first conductive film that is located in a region other than the region opposed to the transparent electrode with the liquid crystal layer in between, the second layer including a second conductive film that is located in a region overlapping the first conductive film. The first conductive film or the second conductive film or both are electrically isolated.

According to an embodiment of the present disclosure, there is provided a liquid crystal display including: a light source; a liquid crystal display device; and a projection section projecting light onto a screen, the light being emitted from the light source and being modulated by the liquid crystal display device. The liquid crystal display device includes: a transparent electrode substrate including a transparent substrate and a transparent electrode, the transparent electrode being formed on one surface of the transparent substrate; a liquid crystal layer; and a pixel electrode substrate including a first layer and a second layer in this order, the first layer including a plurality of pixel electrodes that are located in a region opposed to the transparent electrode with the liquid crystal layer in between, and a first conductive film that is located in a region other than the region opposed to the transparent electrode with the liquid crystal layer in between, the second layer including a second conductive film that is located in a region overlapping the first conductive film. The first conductive film or the second conductive film or both are electrically isolated.

In the liquid crystal display device and the liquid crystal display according to the embodiments of the present disclosure, the first conductive film or the second conductive film or both that are formed in a peripheral region different from an effective region occupied by the pixel electrode are electrically isolated. Therefore, even in the case where electrical continuity is established between the first and the second conductive films being formed in different layers due to mixing of a foreign matter or the like, an operation fault due to short circuit is avoided.

According to the liquid crystal display device and the liquid crystal display according to the embodiments of the present disclosure, the first conductive film or the second conductive film or both that are located in the peripheral region where mixing of a foreign matter easily occurs are electrically isolated. Therefore, short circuit due to mixing of a foreign matter or the like is prevented, and high operation reliability is secured.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 7A and 7B are schematic views of planes for explaining a function of the reflective liquid crystal display device illustrated in FIG. 1.

FIGS. 9A and 9B are plan views illustrating main part configurations of a modification of the reflective liquid crystal display device illustrated in FIG. 1.

DETAILED DESCRIPTION

Embodiments will be hereinafter described in detail with reference to the drawings. The description will be given in the following order:
1. Embodiment (FIG. 1 to FIG. 7B)
Description of Reflective Liquid Crystal Display Device
2. Application Example (FIG. 8)
Description of Reflective Liquid Crystal Display (Projector)
[1. First Embodiment]
[Whole Configuration of Display Device]

Figure 1:
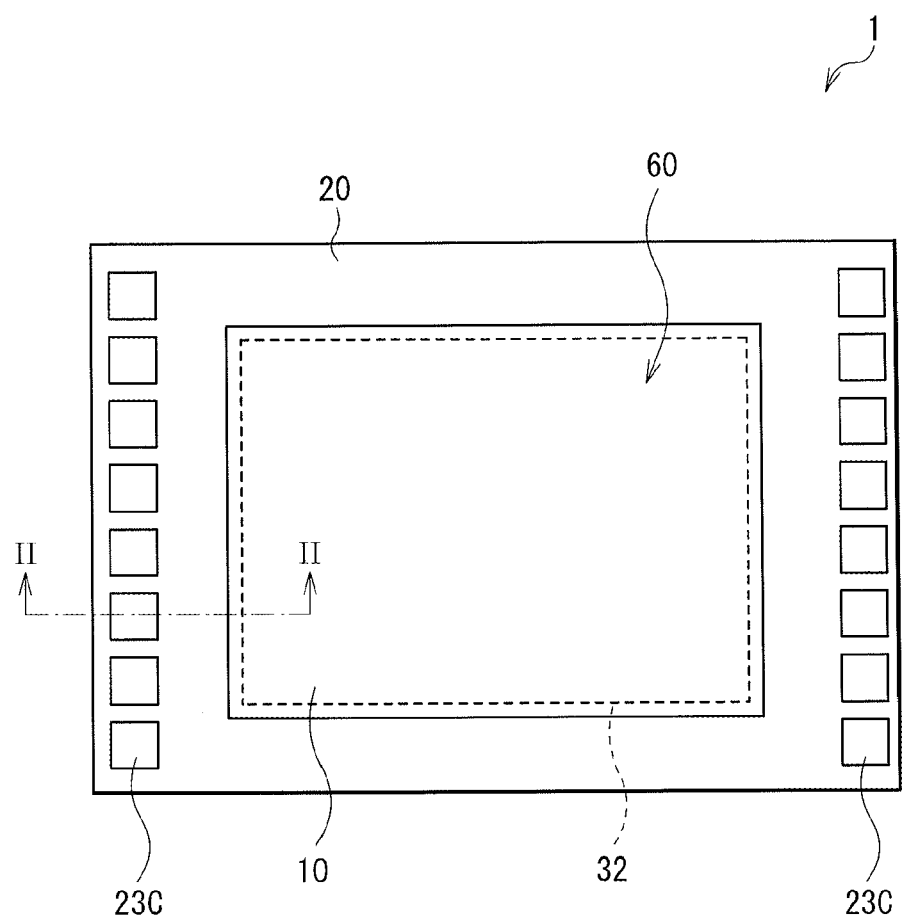
FIG. 1 is a plan view illustrating an example of a configuration of a reflective liquid crystal display device according to an embodiment of the present disclosure.
Figure 2:
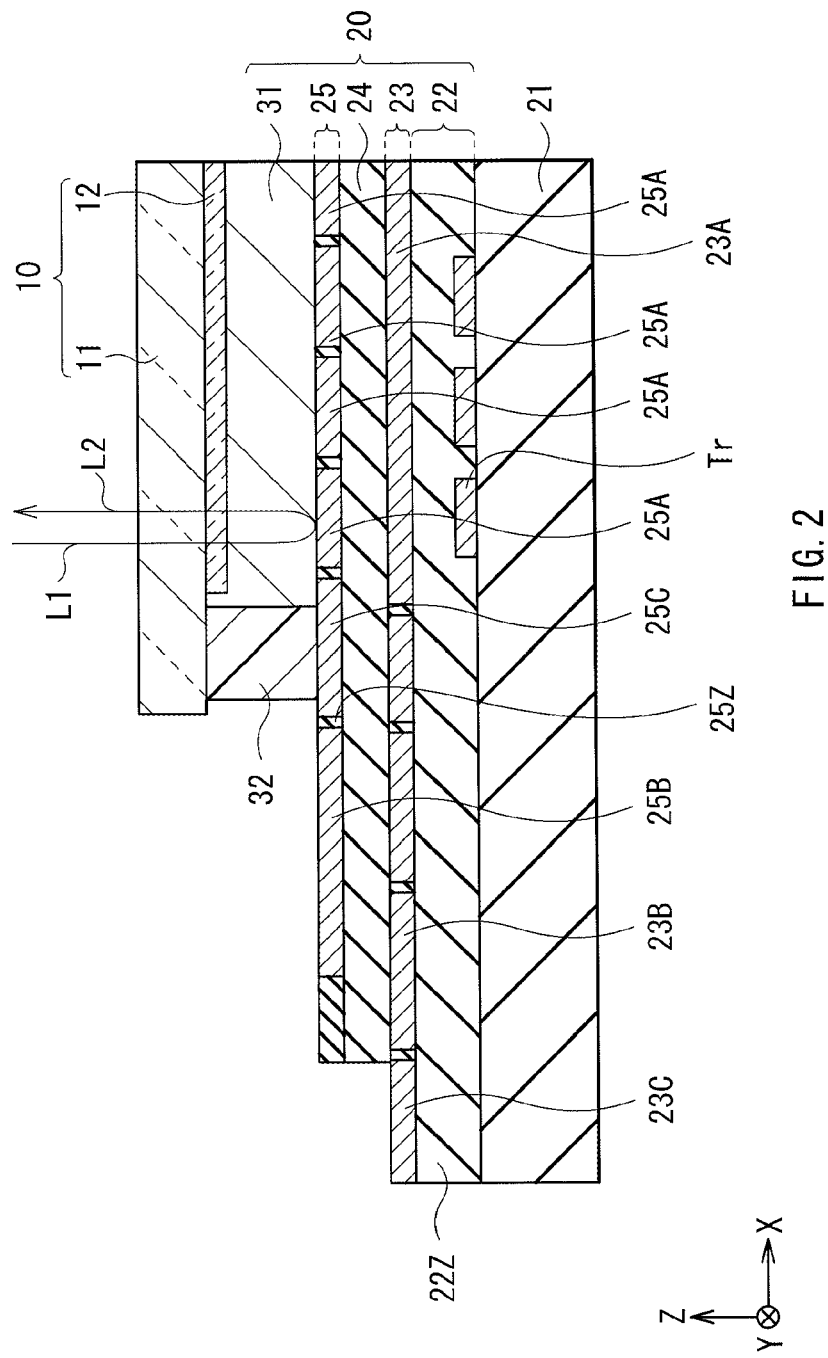
FIG. 2 is a cross-sectional view illustrating a main part of the reflective liquid crystal display device illustrated in FIG. 1.
Figure 3:
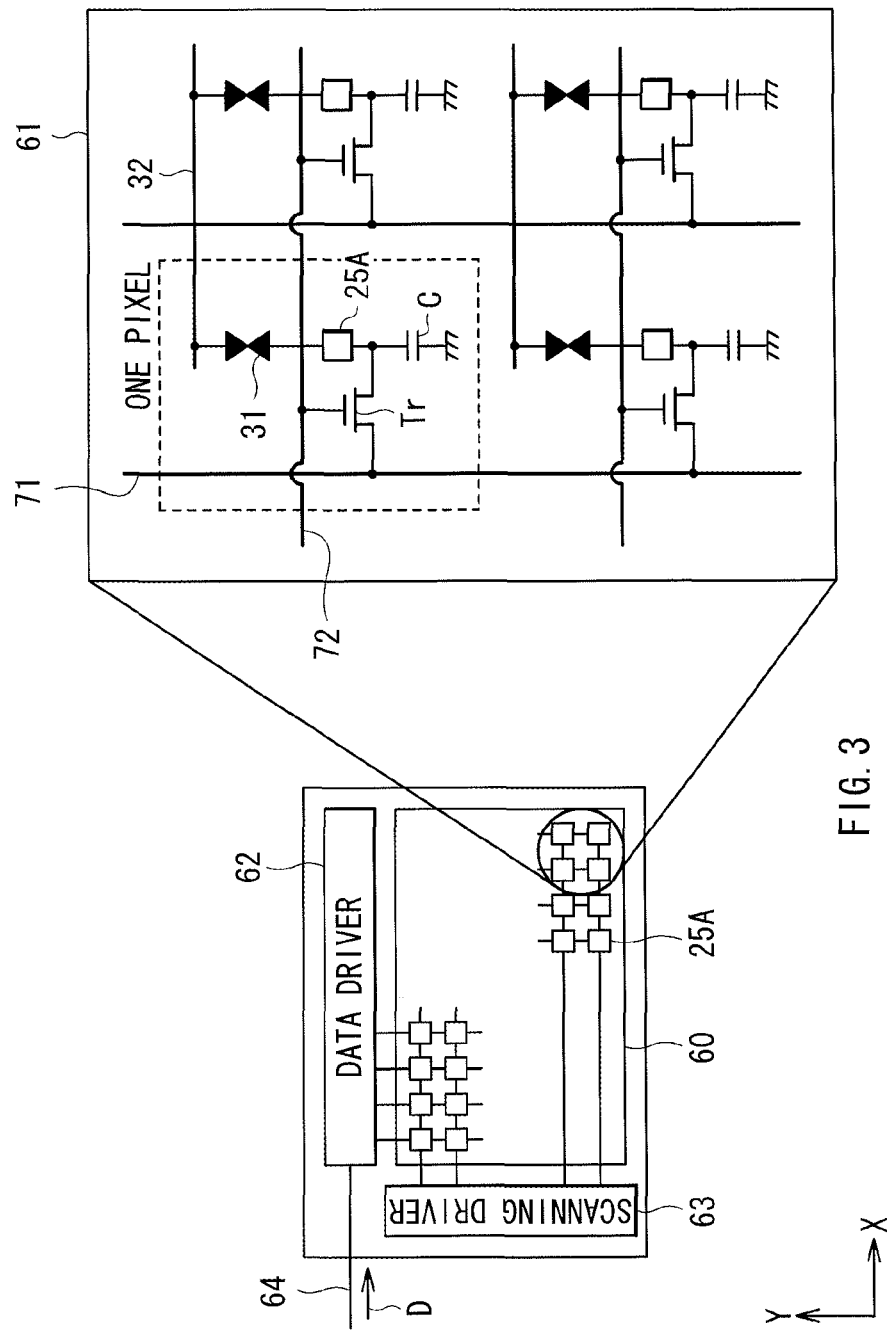
FIG. 3 is a schematic view illustrating a configuration of a drive section of the reflective liquid crystal display device illustrated in FIG. 1.

FIG. 1 is a plan view illustrating a whole configuration of a reflective liquid crystal display device 1 (hereinafter simply referred to as a display device 1) according to this embodiment. FIG. 2 is a cross-sectional view illustrating a main part of the display device 1, and illustrates a cross section taken along a line II-II of FIG. 1 and seen from a direction indicated by arrows. Further, FIG. 3 is a schematic view illustrating a configuration of a drive section of the display device 1. The display device 1 is an active-type reflective liquid crystal display device in which liquid crystal is injected into a space between a pair of substrates placed oppositely. Specifically, the display device 1 includes a transparent electrode substrate 10 and a pixel electrode substrate 20 that are placed oppositely and liquid crystal 31 that is sandwiched therebetween and is sealed by a sealing member 32. For example, as illustrated in FIG. 1, the sealing member 32 is provided along the outer edge of the transparent electrode substrate 10, and joins the transparent electrode substrate 10 and the pixel electrode substrate 20. A region surrounded by the sealing member 32 is a display region (effective region) 60 for displaying an image. In the display region 60, a plurality of pixels are arranged in a state of matrix.

As illustrated in FIG. 3, the drive section has a pixel drive circuit 61 formed in each pixel and a logic section such as a data driver 62 and a scanning driver 63 arranged on the periphery of the display region 60. An image signal D from outside is inputted to the data driver 62 through a signal line 64. The pixel drive circuit 61 is formed in a layer located lower than a pixel electrode 25A, and includes, for example, a transistor Tr1 such as a CMOS and an NMOS and a capacitor (auxiliary capacity) C supplying a voltage to the liquid crystal.

In the pixel drive circuit 61, a plurality of data lines 71 extending in the column direction (Y-axis direction) are arranged in a line in the row direction (X-axis direction), and a plurality of scanning lines 72 extending in the row direction are arranged in a line in the column direction. An intersection of the data line 71 and the scanning line 72 corresponds to one pixel. A source electrode of the respective transistors Tr is connected to the data line 71, and a gate electrode of the respective transistors Tr is connected to the scanning line 72. A drain electrode of the respective transistors Tr is connected to the respective pixel electrode 25A and auxiliary capacity C. The respective data lines 71 are connected to the data driver 62, and receive an image signal from the data driver 62. The respective scanning lines 72 are connected to the scanning driver 63, and a scanning signal is sequentially supplied from the scanning driver 63. It is to be noted that the drive section is not limited to the analog drive type, and may be a digital drive type.

The transparent electrode substrate 10 has a transparent substrate 11 made of a transparent material such as glass and plastic and a transparent electrode 12 formed on the inner surface of the transparent electrode 11, that is, the surface in contact with the liquid crystal 31 (surface opposed to the pixel electrode substrate 20). The transparent electrode 12 is provided to fully occupy the display region 60. For example, an oriented film (not illustrated) may be formed on the entire surface of the transparent electrode 12. As a component material of the transparent electrode 12, for example, an electrode material having an optical transmission function such as ITO (indium tin oxide) as a solid solution material of tin oxide ($SnO_2$) and indium oxide ($In_2O_3$) is used. A common electric potential (for example, a ground electric potential) is applied to the transparent electrode 12 in all pixels.

Figure 4A:
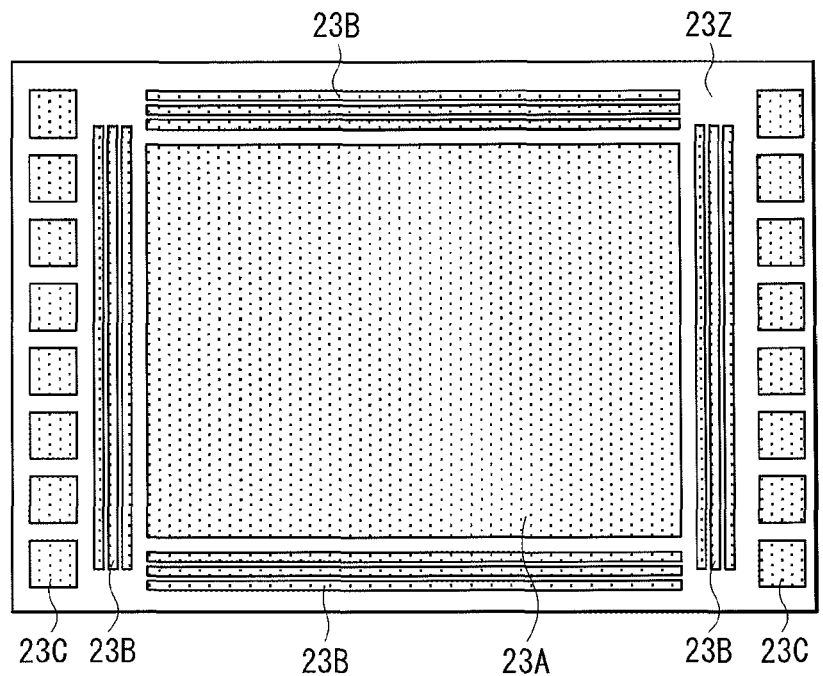
FIGS. 4A and 4B are plan views illustrating planar configurations of metal layers included in the reflective liquid crystal display device illustrated in FIG. 1.
Figure 4B:
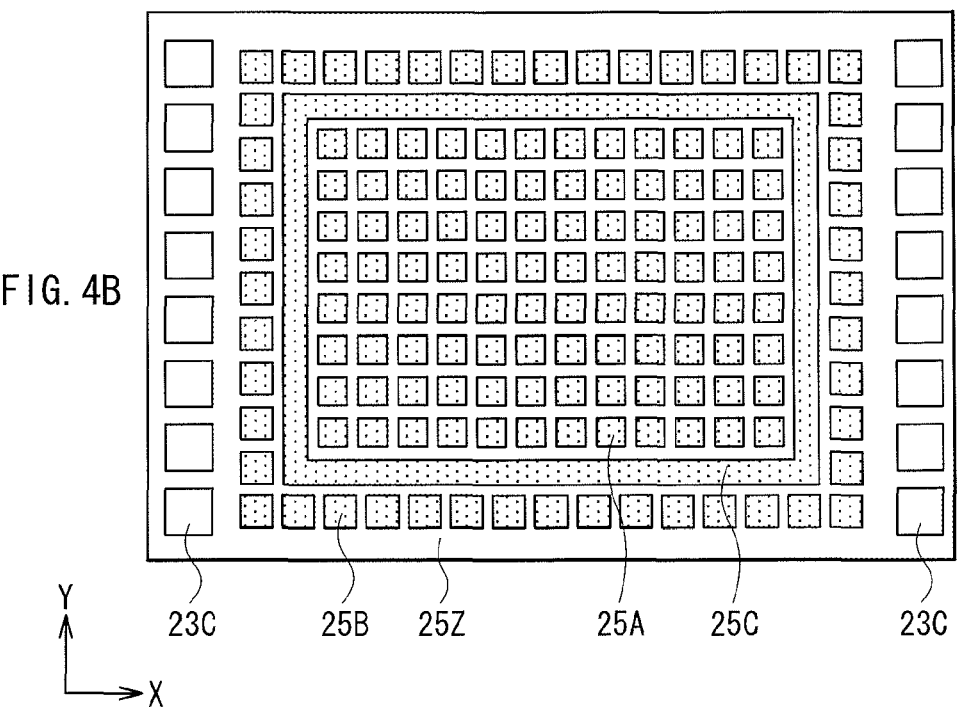

In the pixel electrode substrate 20, a circuit formation layer 22, a metal layer 23, an insulating layer 24, and a metal layer 25 are sequentially formed on a support substrate 21 made of, for example, monocrystal silicon and/or the like. FIGS. 4A and 4B are plan views respectively illustrating planar configurations of the metal layers 23 and 25.

Figure 5:
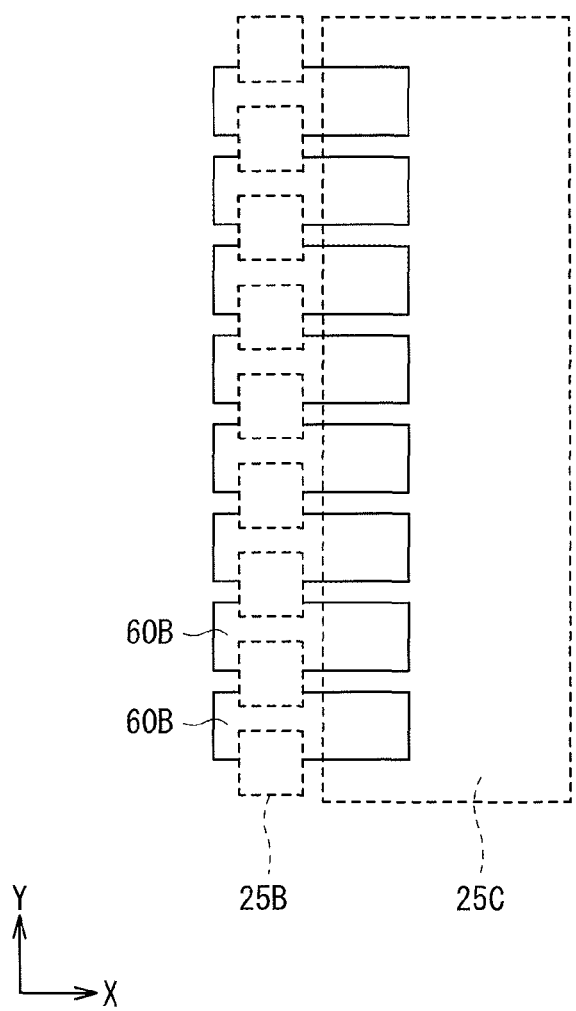
FIG. 5 is a schematic view illustrating a position relation between a circuit formation layer and a metal layer included in the reflective liquid crystal display device illustrated in FIG. 1.

In the display region 60 in the circuit formation layer 22, the pixel drive circuit 61 is formed. Further, in the peripheral region surrounding the display region 60 in the circuit formation layer 22, the data driver 62, the scanning driver 63, and the like are formed. For example, as illustrated in FIG. 5, the data driver 62 and the scanning driver 63 have a plurality of circuit blocks 60B provided correspondingly to each of the predetermined number of pixel groups. The respective circuit blocks 60B include, for example, an LVDS (low voltage differential signaling) circuit as an interface converting a digital signal to a voltage for digital drive and/or the like in the case of a digital drive type. In the circuit formation layer 22, the pixel drive circuit 61, the data driver 62, and the scanning driver 63 are buried within an insulating film 22Z.

For example, as illustrated in FIG. 4A, the metal layer 23 is provided with a light shielding film 23A, a plurality of signal lines 23B, and a plurality of external connection terminals 23C each having a predetermined shape in respective predetermined positions. The light shielding film 23A, the signal lines 23B, and the external connection terminals 23C are made of a metal material showing high electric conductivity and having a superior light shielding characteristics such as Cu (copper). The light shielding film 23A, the signal lines 23B, and the external connection terminals 23C are insulated from each other by the insulating film 23Z filling each gap thereof. The light shielding film 23A is a solid film formed to occupy a region overlapping all the pixel electrodes 25A (described later) included in the metal layer 25, that is, the display region, for example. It is to be noted that the light shielding film 23A may be formed to occupy a region overlapping a light shielding film 25C (described later) of the metal layer 25 in addition thereto. The light shielding film 23A functions to prevent light that has passed a gap between the pixel electrodes 25A out of light that has passed the transparent electrode substrate 10 and entered the pixel electrode substrate 20 from entering the drive circuit (in particular, the transistor Tr) in the circuit formation layer 22. The signal line 23B is a wiring to supply, for example, the image signal D (described later) from outside and a drive voltage. Further, the external connection terminal 23C is connected to the data line 71 or the scanning line 72 configuring the pixel drive circuit 61, for example.

For example, as illustrated in FIG. 4B, the metal layer 25 is provided with the plurality of pixel electrodes 25A, a light shielding film 25B, and the light shielding film 25C each having a predetermined shape in respective predetermined positions.

The plurality of pixel electrodes 25A are arranged in a state of matrix along the display region 60 extending over an XY plane. That is, one pixel electrode 25A forms one pixel together with the transparent electrode 12, the liquid crystal 31, and the like. The pixel electrode 25A is a reflective pixel electrode that reflects light that has passed the transparent electrode substrate 10. That is, the pixel electrode 25A has both a function as a light reflective film and a function as an electrode to apply a voltage to the liquid crystal 31. Therefore, the pixel electrode 25A is made of a metal material showing high electric conductivity and having a superior light reflection ability such as Al (aluminum) and silver (Ag). To further improve the reflectance, a reflecting layer configured of a multilayer film such as a dielectric mirror may be laminated on the pixel electrode 25A. Further, to protect the pixel electrode 25A, the plurality of pixel electrodes 25A may be fully covered with an oxide film or a nitride film.

The light shielding films 25B and 25C prevent light from entering the drive circuit (in particular, the transistor Tr) in the circuit formation layer 22 as the light shielding film 23A does. For example, the light shielding films 25B and 25C are made of a metal material similar to that of light shielding film 23A or the pixel electrode 25A. The pixel electrode 25A, the light shielding film 25B, and the light shielding film 25C are insulated from each other by an insulating layer 25Z filling a gap therebetween. It is to be noted that an opening is provided in a region corresponding to the external connection terminal 23C of the metal layer 23 in the insulating layer 25Z, and the external connection terminal 23C is exposed.

The light shielding film 25B is formed in a region on the periphery of the display region 60 to surround all the pixel electrodes 25A. Further, for example, as illustrated in FIG. 5, the light shielding film 25B is desirably configured of a plurality of sections separated in a position different from a boundary position between the circuit blocks 60B in the circuit formation layer 22. The light shielding film 25B is in contact with the insulating layer 24 and the insulating film 25Z, and is electrically isolated from the surroundings (floating state).

The light shielding film 25C is formed between the pixel electrode 25A and the light shielding film 25B surrounding the pixel electrode 25A. For example, the sealing member 32 is formed thereon. Further, the light shielding film 25C desirably has the same electric potential as that of the transparent electrode 12. This is because an unintentional electric potential difference inside the liquid crystal 31 is thereby avoided to stabilize behavior of the liquid crystal 31.

[Operation of Display Device]

Next, a description will be given of operation of the display device 1 formed as above.

In the display device 1, incident light L1 that has sequentially passed the transparent electrode substrate 10 and the liquid crystal 31 is reflected by the reflection function of the reflective pixel electrode 25A. The light L1 reflected by the pixel electrode 25A sequentially passes the liquid crystal 31 and the transparent electrode substrate 10, and is emitted outside. At this time, the optical characteristics of the liquid crystal 31 are changed according to the electric potential difference between the opposed electrodes (that is, the electric potential difference between the pixel electrode 25A and the transparent electrode 12), and modulates the passing light L1. By such light modulation, gradation expression is enabled, and modulated light L2 is used for displaying an image.

Applying a voltage to the liquid crystal 31 is performed by the pixel drive circuit 61 illustrated in FIG. 3. The data driver 62 supplies an image signal to the data line 71 according to the image signal D from outside inputted through the signal line 64. The scanning driver 63 sequentially supplies a scanning signal to the respective scanning lines 72 at predetermined timing. This selectively drives a pixel in a section where scanning is made according to the scanning signal from the scanning line 72 and the pixel signal from the data line 71 is applied.

[Function and Effect of Display Device]

In the display device 1, as a layer higher than the circuit formation layer 22, the metal layer 25 including the pixel electrode 25A and the light shielding films 25B and 25C having light shielding characteristics or a light reflective ability is provided. Therefore, the incident light L1 is allowed to be prevented from entering the pixel drive circuit 61, the data driver 62, the scanning driver 63, and the like. In particular, since the light shielding film 23A is provided between the circuit formation layer 22 and the metal layer 25, the incident light L1 passing the space between the pixel electrodes 25A is securely allowed to be blocked. Therefore, a false operation of the drive section is allowed to be securely avoided.

Figure 6A:
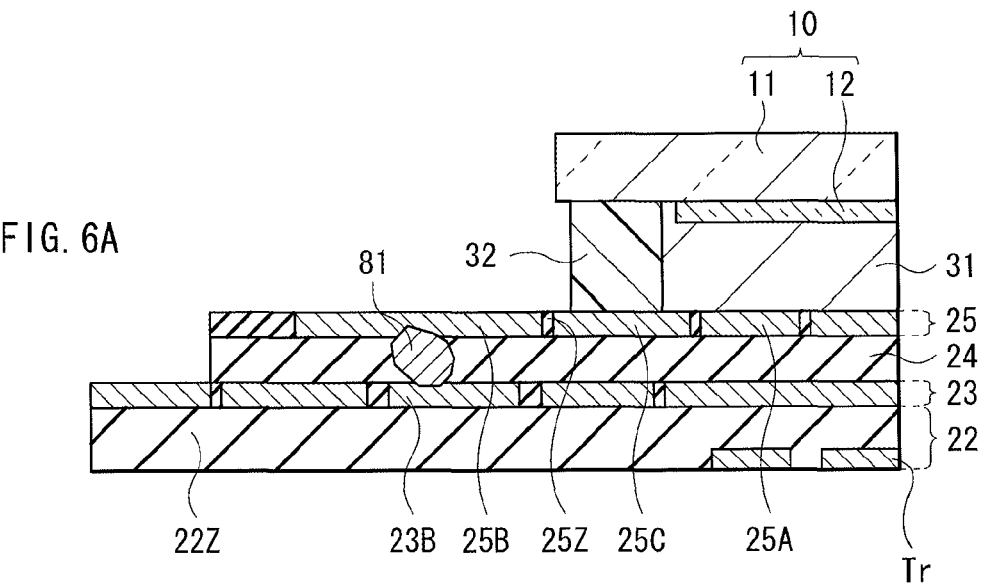
FIGS. 6A and 6B are schematic views of cross sections for explaining a function of the reflective liquid crystal display device illustrated in FIG. 1.
Figure 6B:
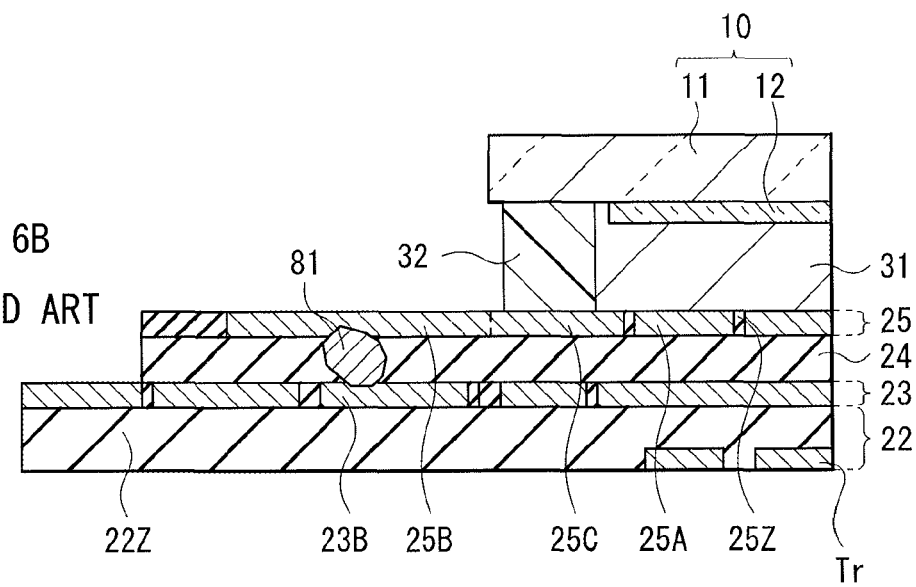

In this case, the light shielding film 25B in the metal layer 25 is electrically isolated from the surroundings. Therefore, short circuit between the pixel electrode25A and the light shielding film 25C, and the signal line 23B in the metal layer 23, caused by mixing of a foreign matter that occurs in, for example, a manufacturing step, is allowed to be avoided. Specifically, for example, as illustrated in FIG. 6A, in the case where a conductive foreign matter 81 caused by some factor sticks from the light shielding film25B to the signal line 23B, electrical continuity is established between the light shielding film 25B and the signal line 23B. However, by electrically isolating the light shielding film 25B in advance, the electric potential of the light shielding film 25B is allowed to be equal to that of the signal line 23B to obtain a stable state. Meanwhile, for example, as a comparative example illustrated in FIG. 6B, in the case where the light shielding film25B is not separated from the light shielding film 25C, and the electric potential of the light shielding film 25B is equal to that of the transparent electrode 12, in some cases, short circuit between the insulating film 25B and the signal line 23B is caused by intrusion of the foreign matter 81 (first short circuit mode). In this embodiment, such a first short circuit mode is allowed to be avoided.

It is to be noted that even if the light shielding film 25B is electrically isolated as described above, though the probability is low, for example, as illustrated in FIG. 7A, in the case where mixing of a foreign matter occurs at the same time in a plurality of locations, short circuit may occur among two or more signal lines 23B through one light shielding film 25B (second short circuit mode). Specifically, in a comparative example of FIG. 7A, in the case where electrical continuity is established between a signal line 23B1 and the light shielding film 25B thorough the foreign matter 81 and electrical continuity is established between a signal line 23B2 and the light shielding film 25B thorough a foreign matter 82, the signal line 23B1 and the signal line 23B2 having different electric potential differences are short-circuited through the light shielding film 25B. Meanwhile, in this embodiment, since the light shielding film 25B is separated into a plurality of sections, such a second short circuit mode is allowed to be avoided. Specifically, even if electrical continuity is established between the signal line 23B1 and a light shielding film 25B1 thorough the foreign matter 81 and electrical continuity is established between the signal line 23B2 and a light shielding film 25B2 thorough the foreign matter 82 as illustrated in FIG. 7B, the signal line 23B1 and the signal line 23B2 are not short-circuited. One reason for this is that the light shielding film 25B1 is insulated from the light shielding film 25B2. Further, in this embodiment, since the boundary position between the light shielding films 25B is different from the boundary position between the circuit blocks formed in the circuit formation layer 22, intrusion of the incident light L1 to inside of the circuit block is allowed to be avoided more securely.

As described above, according to the display device 1 according to this embodiment, the light shielding film 25B formed in the peripheral region where mixing of a foreign matter easily occurs that surrounds the display region 60 is electrically isolated. Therefore, even if electrical continuity is established between the light shielding film 25B and the signal line 23B that overlap each other in the thickness direction resulting from mixing of a foreign matter or the like, an operation fault due to short circuit is allowed to be avoided. Further, an operation fault of the drive section due to incidence of unnecessary light is allowed to be avoided by the light shielding film 25B and/or the like. Therefore, high operation reliability is allowed to be secured while downsizing of the whole configuration is achieved.

[2. Application Example]

Next, a description will be given of an application example of the foregoing display device.

The display device according to the embodiment of the present technology is applicable to a liquid crystal display. In this case, as illustrated in FIG. 8, a description will be given of a reflective liquid crystal projector using the reflective liquid crystal display device (display device 1) as a light bulb as an example.

Figure 8:
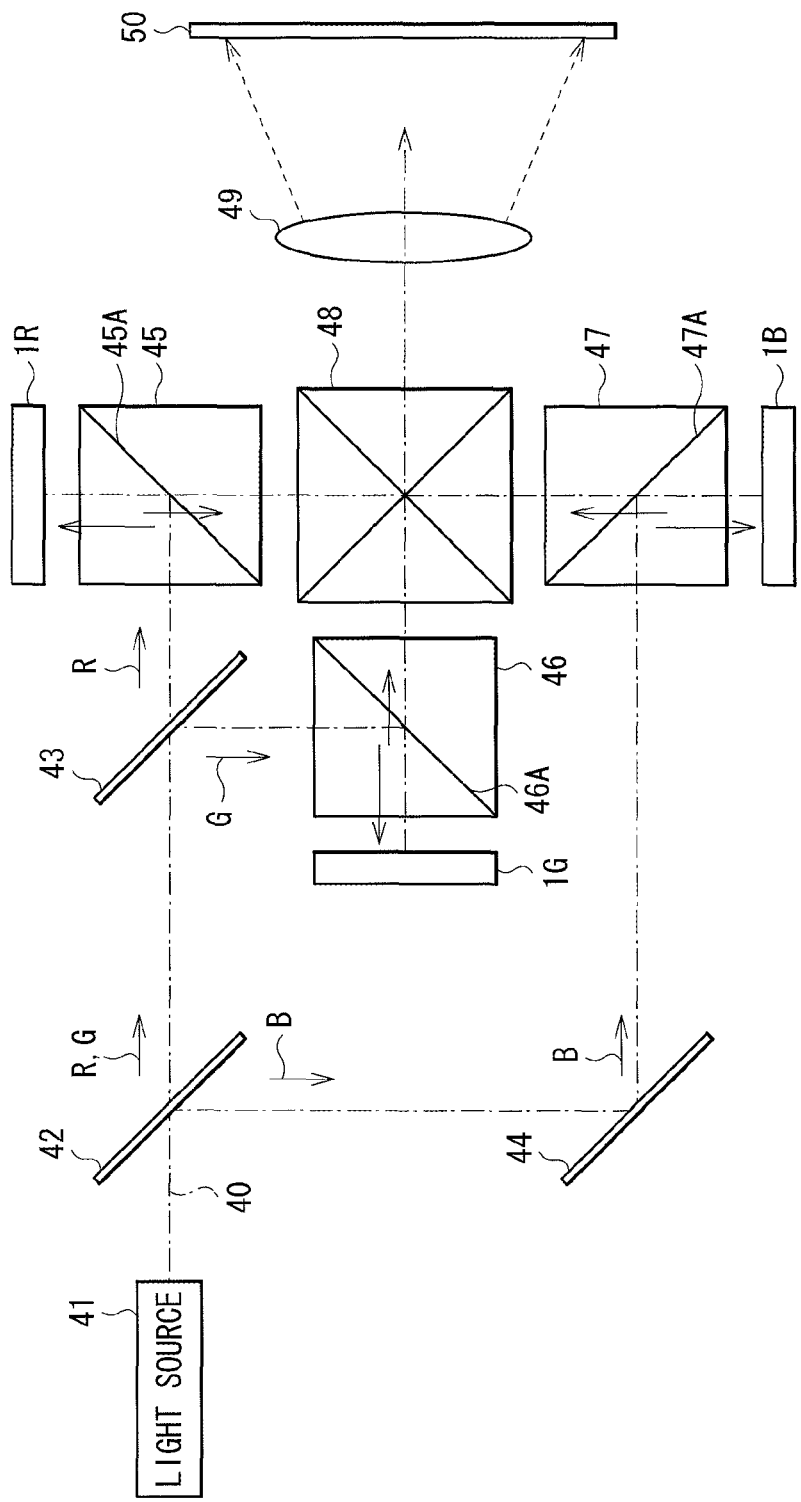
FIG. 8 is a schematic view illustrating a whole configuration of a projector using the reflective liquid crystal display device illustrated in FIG. 1.

The reflective liquid crystal projector illustrated in FIG. 8 is what we call a three-panel scheme reflective liquid crystal projector that displays a color image by using three liquid crystal light bulbs 1R, 1G, and 1B for red, green, and blue, respectively. The reflective liquid crystal projector includes a light source 41, dichroic mirrors 42 and 43, and an total-reflection mirror 44 along a light axis 40. The reflective liquid crystal projector further includes polarization beam splitters 45, 46, and 47, a dichroic prism 48, a projection lens 49, and a screen 50.

The light source 41 emits white light including red light (R), blue light (B), and green light (G) necessary for displaying a color image. The light source 41 is configured of, for example, a halogen lamp, a metal halide lamp, a xenon lamp, or the like.

The dichroic minor 42 has a function to split light from the light source 41 into blue light and light of the other colors. The dichroic minor 43 has a function to split light that has passed the dichroic minor 42 into red light and green light. The total-reflection minor 44 reflects blue light split by the dichroic minor 42 toward the polarization beam splitter 47.

The polarization beam splitters 45, 46, and 47 are respectively provided along light paths of red light, green light, and blue light. The polarization beam splitters 45, 46, and 47 respectively have polarization split planes 45A, 46A, and 47A, and have a function to split incident light of each color into two polarization components perpendicular to each other in the polarization split planes 45A, 46A, and 47A. The polarization split planes 45A, 46A, and 47A reflect one polarization component (for example, S polarization component), and transmit the other polarization component (for example, P polarization component).

The liquid crystal light bulbs 1R, 1G, and 1B are configured of a display device similar to the display device 1 (FIG. 1) having the foregoing configuration. Light of color of a predetermined polarization component (for example, the S polarization component) split by the polarization split planes 45A, 46A, and 47A of the polarization beam splitters 45, 46, and 47 enters the liquid crystal light bulbs 1R, 1G, and 1B. The liquid crystal light bulbs 1R, 1G and 1B have a function as follows. That is, the liquid crystal light bulbs 1R, 1G, and 1B are driven according to a drive voltage given based on an image signal, modulate incident light, and reflect the modulated light toward the polarization beam splitters 45, 46, and 47.

The dichroic prism 48 has a function to synthesize light of color of a predetermined polarization component (for example, the P polarization component) that has been emitted from the liquid crystal light bulbs 1R, 1G, and 1B and has passed the polarization beam splitters 45, 46, and 47. The projection lens 49 has a function as a projector that projects synthesized light emitted from the dichroic prism 48 onto the screen 50.

In the reflective liquid crystal projector formed as above, white light emitted from the light source 41 is firstly split into blue light and light of the other colors (red light and green light) by the function of the dichroic minor 42. Of the foregoing, the blue light is reflected by the function of the total-reflection minor 44 toward the polarization beam splitter 47. Meanwhile, the red and green light is further split into red light and green light by the function of the dichroic minor 43. The split red light and the split green light respectively enter the polarization beam splitters 45 and 46.

The polarization beam splitters 45, 46, and 47 split entered light of each color into two polarization components perpendicular to each other in the polarization split planes 45A, 46A, and 47A. At this time, the polarization split planes 45A, 46A, and 47A reflect one polarization component (for example, the S polarization component) toward the liquid crystal light bulbs 1R, 1G, and 1B.

The liquid crystal light bulbs 1R, 1G, and 1B are driven according to a drive voltage given based on an image signal, and modulate incident light of color of a predetermined polarization component in units of pixel. At this time, the liquid crystal light bulbs 1R, 1G, and 1B are configured of the display device 1 illustrated in FIG. 1. Therefore, high operation reliability is allowed to be exhibited without operation faults due to short circuit or entrance of unnecessary light even if its configuration is compact.

The liquid crystal light bulbs 1R, 1G, and 1B reflect the modulated light of each color toward the polarization beam splitters 45, 46, and 47. The polarization beam splitters 45, 46, and 47 transmit only a predetermined polarization component (for example, the P polarization component) out of the reflected light (modulated light) from the liquid crystal light bulbs 1R, 1G, and 1B, and emit such a predetermined polarization component toward the dichroic prism 48. The dichroic prism 48 synthesizes the light of color of the predetermined polarization component that has passed the polarization beam splitters 45, 46, and 47, and emits the light toward the projection lens 49. The projection lens 49 projects synthesized light emitted from the dichroic prism 48 onto the screen 50. Thereby, an image corresponding to the light modulated by the liquid crystal light bulbs 1R, 1G, and 1B is projected onto the screen 50, and a desired image is displayed.

As described above, according to the reflective liquid crystal projector according to this embodiment, the display device (FIG. 1) described in the foregoing embodiment is used as the liquid crystal light bulbs 1R, 1G, and 1B. Therefore, high operation reliability is allowed to be secured while downsizing of the whole configuration is achieved.

While the present technology has been described with reference to the embodiment, the present technology is not limited to the foregoing embodiment and the like, and various modifications may be made. For example, though in the foregoing embodiment, in the pixel electrode substrate 20, the light shielding film 25B included in the metal layer 25 located in the uppermost layer is electrically isolated, the present technology is not limited thereto. For example, an electrically-isolated metal film may be provided in the metal layer 23 located under the metal layer 25. That is, for example, in FIG. 2, the metal layer 25 may include a metal film corresponding to the signal line 23B, and the metal layer 23 may include a metal film corresponding to the light shielding film 25B.

Further, in the foregoing embodiment, the light shielding film 25B in the metal layer 25 is separated into a plurality of sections in the extending direction of the signal line 23B. However, the present technology is not limited thereto, and the configuration thereof may be changed as appropriate. For example, as illustrated in FIGS. 9A and 9B, the light shielding film 25B in the metal layer 25 may be separated into a plurality of sections in the direction in which the plurality of signal lines 23B are arranged. Thereby, probability of short circuit is allowed to be further decreased.

It is possible to achieve at least the following configurations from the above-described exemplary embodiment and the modification of the disclosure.

(1) A liquid crystal display device including:
a transparent electrode substrate including a transparent substrate and a transparent electrode, the transparent electrode being formed on one surface of the transparent substrate;
a liquid crystal layer; and
a pixel electrode substrate including a first layer and a second layer in this order, the first layer including a plurality of pixel electrodes that are located in a region opposed to the transparent electrode with the liquid crystal layer in between, and a first conductive film that is located in a region other than the region opposed to the transparent electrode with the liquid crystal layer in between, the second layer including a second conductive film that is located in a region overlapping the first conductive film, wherein
the first conductive film or the second conductive film or both are electrically isolated.

(2) The liquid crystal display device according to (1), wherein the pixel electrode substrate includes a circuit formation layer being located on an opposite side of the second layer from the transparent electrode substrate, the circuit formation layer including a plurality of drive devices that are connected to the pixel electrodes.

(3) The liquid crystal display device according to (1) or (2), wherein the circuit formation layer includes a plurality of circuit blocks, the plurality of circuit blocks each including a transistor as the drive device.

(4) The liquid crystal display device according to any one of (1) to (3), wherein the first conductive film or the second conductive film or both have light shielding characteristics.

(5) The liquid crystal display device according to (4), wherein the first conductive film or the second conductive film or both are divided in a position different from a boundary position between the circuit blocks, into a plurality of sections.

(6) The liquid crystal display device according to (5), wherein the pixel electrodes are each made of a conductive material, the conductive material reflecting light that has passed the transparent electrode substrate.

(7) The liquid crystal display device according to (6), wherein the first conductive film surrounds the plurality of pixel electrodes.

(8) The liquid crystal display device according to any one of (1) to (7), wherein the first layer includes a first light shielding film, the first light shielding film being formed between the first conductive film and the pixel electrodes.

(9) The liquid crystal display device according to (8), wherein the pixel electrode substrate is joined with the transparent electrode substrate by a sealing member, the sealing member being provided on the first light shielding film.

(10) The liquid crystal display device according to (8) or (9), wherein the pixel electrodes, the first light shielding film, and the first conductive film are made of a same material, and are insulated from each other.

(11) The liquid crystal display device according to any one of (8) to (10), wherein the first light shielding film has a same electric potential as an electric potential of the transparent electrode.

(12) The liquid crystal display device according to any one of (1) to (11), wherein the second layer includes a second light shielding film, the second light shielding film being formed in a region overlapping the plurality of pixel electrodes.

(13) A liquid crystal display including:
a light source;
the liquid crystal display device according to any one of (1) to (12); and
a projection section projecting light onto a screen, the light being emitted from the light source and being modulated by the liquid crystal display device.

It should be understood by those skilled in the art that various modifications, combinations, sub-combinations, and alternations may occur depending on design requirements and other factors insofar as they are within the scope of the appended claims or the equivalents thereof.

What is claimed is:

1. A liquid crystal display device comprising:
a transparent electrode substrate including a transparent substrate and a transparent electrode, the transparent electrode being formed on one surface of the transparent substrate;
a liquid crystal layer; and
a pixel electrode substrate including a first layer and a second layer in this order, the first layer including a plurality of pixel electrodes that are located in a region opposed to the transparent electrode with the liquid crystal layer in between, and a first conductive film that is located entirely in a region outside the region opposed to the transparent electrode with the liquid crystal layer in between, the second layer including a second conductive film that is located in a region overlapping the first conductive film, wherein the first layer includes a first light shielding film, the first light shielding film being formed between the first conductive film and the pixel electrodes and being electrically insulated from the first conductive film and from the pixel electrodes, wherein the pixel electrode substrate is joined with the transparent electrode substrate by a sealing member, the sealing member being in direct physical contact with the first light shielding film, wherein the first conductive film or the second conductive film or both are in a floating state electrically isolated from their surroundings, and wherein the first conductive film is separated into a plurality of sections along a length of lead lines formed in the second conductive film.

2. The liquid crystal display device according to claim 1, wherein the pixel electrode substrate includes a circuit formation layer being located on an opposite side of the second layer from the transparent electrode substrate, the circuit formation layer including a plurality of drive devices that are connected to the pixel electrodes.

3. The liquid crystal display device according to claim 2, wherein the circuit formation layer includes a plurality of circuit blocks, the plurality of circuit blocks each including a transistor as the drive device.

4. The liquid crystal display device according to claim 3, wherein the first conductive film or the second conductive film or both have light shielding characteristics.

5. The liquid crystal display device according to claim 4, wherein the first conductive film is divided into the plurality of sections in a position different from a boundary position between the circuit blocks.

6. The liquid crystal display device according to claim 1, wherein the pixel electrodes are each made of a conductive material, the conductive material reflecting light that has passed the transparent electrode substrate.

7. The liquid crystal display device according to claim 1, wherein the first conductive film surrounds the plurality of pixel electrodes.

8. The liquid crystal display device according to claim 1, wherein the pixel electrodes, the first light shielding film, and the first conductive film are made of a same material, and are insulated from each other.

9. The liquid crystal display device according to claim 1, wherein the first light shielding film has a same electric potential as an electric potential of the transparent electrode.

10. The liquid crystal display device according to claim 1, wherein the second layer includes a second light shielding film, the second light shielding film being formed in a region overlapping the plurality of pixel electrodes.

11. A liquid crystal display comprising:
a light source;
a liquid crystal display device; and
a projection section projecting light onto a screen, the light being emitted from the light source and being modulated by the liquid crystal display device, wherein the liquid crystal display device includes
a transparent electrode substrate including a transparent substrate and a transparent electrode, the transparent electrode being formed on one surface of the transparent substrate,
a liquid crystal layer, and
a pixel electrode substrate including a first layer and a second layer in this order, the first layer including a plurality of pixel electrodes that are located in a region opposed to the transparent electrode with the liquid crystal layer in between, and a first conductive film that is located entirely in a region outside the region opposed to the transparent electrode with the liquid crystal layer in between, the second layer including a second conductive film that is located in a region overlapping the first conductive film, wherein the first layer includes a first light shielding film, the first light shielding film being formed between the first conductive film and the pixel electrodes and being electrically insulated from the first conductive film and from the pixel electrodes, wherein the pixel electrode substrate is joined with the transparent electrode substrate by a sealing member, the sealing member being in direct physical contact with the first light shielding film, wherein the first conductive film or the second conductive film or both are in a floating state electrically isolated from their surroundings, and wherein the first conductive film is separated into a plurality of sections along a length of lead lines formed in the second conductive film.

* * * * *